United States Patent
Willard, Jr. et al.

(10) Patent No.: US 10,603,957 B2
(45) Date of Patent: Mar. 31, 2020

(54) HIGH-GRIP PROFILED TREAD SKIMS

(71) Applicants: Walter Lee Willard, Jr., Greenville, SC (US); John Christopher Church, Piedmong, SC (US)

(72) Inventors: Walter Lee Willard, Jr., Greenville, SC (US); John Christopher Church, Piedmong, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 561 days.

(21) Appl. No.: 14/890,796

(22) PCT Filed: May 30, 2013

(86) PCT No.: PCT/US2013/043316
§ 371 (c)(1),
(2) Date: Nov. 12, 2015

(87) PCT Pub. No.: WO2014/193384
PCT Pub. Date: Dec. 4, 2014

(65) Prior Publication Data
US 2016/0089936 A1    Mar. 31, 2016

(51) Int. Cl.
*B60C 11/00*    (2006.01)

(52) U.S. Cl.
CPC ...... *B60C 11/0041* (2013.01); *B60C 11/0008* (2013.01); *B60C 11/0066* (2013.01); *B60C 2011/0025* (2013.01)

(58) Field of Classification Search
CPC ............... B60C 11/005; B60C 11/0058; B60C 11/0066; B60C 11/1346
See application file for complete search history.

(56) References Cited

U.S. PATENT DOCUMENTS

| 4,478,266 A | 10/1984 | Pierson et al. |
| 4,619,300 A | 10/1986 | Higashimurayama et al. |

(Continued)

FOREIGN PATENT DOCUMENTS

| DE | 19945264 A1 | 3/2001 |
| EP | 2 050 587 A1 | 4/2009 |

(Continued)

OTHER PUBLICATIONS

English machine translation of JP03-025003 (Year: 1991).*

(Continued)

*Primary Examiner* — Robert C Dye
(74) *Attorney, Agent, or Firm* — Dority & Manning, P.A.

(57) ABSTRACT

A tire tread is provided that in an unworn state includes one or more tread features having a layer of a relatively softer, higher grip rubber material. This layer is formed from a first rubber composition that is provided as a skim or relatively thin layer at the contact surface of the tread feature. This skim provides the grip needed as the tire starts to warm up but can then wear away after an initial period of use so that the contact surface is eventually formed from a second rubber composition. This second rubber composition, in turn, provides the desired level of grip and acceptable wear at the higher temperatures that occur as the tire heats up from use. The layer of skim can be profiled depending upon the application and performance characteristics needed.

14 Claims, 4 Drawing Sheets

(56) References Cited

U.S. PATENT DOCUMENTS

| | | | |
|---|---|---|---|
| 5,176,765 A | | 1/1993 | Yamaguchi et al. |
| 5,840,137 A | * | 11/1998 | Futamura ............... B60C 11/00 152/209.1 |
| 6,247,512 B1 | * | 6/2001 | Radulescu ............. B60C 11/18 152/209.5 |
| 2002/0143095 A1 | * | 10/2002 | Zanzig ................. B60C 1/0016 524/492 |
| 2002/0174924 A1 | | 11/2002 | Zanzig et al. |
| 2004/0050469 A1 | | 3/2004 | Sandstrom |
| 2007/0295433 A1 | | 12/2007 | Losi et al. |
| 2008/0105353 A1 | | 5/2008 | Losi et al. |
| 2010/0230021 A1 | | 9/2010 | Merino Lopez et al. |
| 2014/0027029 A1 | | 1/2014 | Kondo et al. |

FOREIGN PATENT DOCUMENTS

| | | | |
|---|---|---|---|
| EP | 2 067 637 A1 | | 6/2009 |
| FR | 2005522 A1 | | 12/1969 |
| FR | 2 952 855 | | 11/2009 |
| JP | S51100504 | | 9/1976 |
| JP | 58211902 A | | 12/1983 |
| JP | 62059105 A | | 3/1987 |
| JP | H01278804 A | | 11/1989 |
| JP | 2127102 A | | 5/1990 |
| JP | 03-025003 | * | 2/1991 |
| JP | H0425707 A | | 9/1992 |
| JP | H04252707 | | 9/1992 |
| JP | 11254909 A | | 9/1999 |
| JP | 2003253045 | | 9/2003 |
| JP | 2005-280511 | * | 10/2005 |
| JP | 2008044530 | * | 2/2008 |
| JP | 2010023577 | | 2/2010 |
| JP | 2010215115 | | 9/2010 |
| WO | WO 2012/175444 A1 | | 12/2002 |
| WO | WO2004/096583 A1 | | 11/2004 |
| WO | WO2012141158 A1 | | 10/2012 |
| WO | WO 2012/161314 A1 | | 11/2012 |

OTHER PUBLICATIONS

English machine translation of JP2005-280511 (Year: 2005).*
English machine translation of JP2008044530 (Year: 2008).*
PCT International Search Report for PCT/US2013/043316, dated Oct. 31, 2013.

* cited by examiner

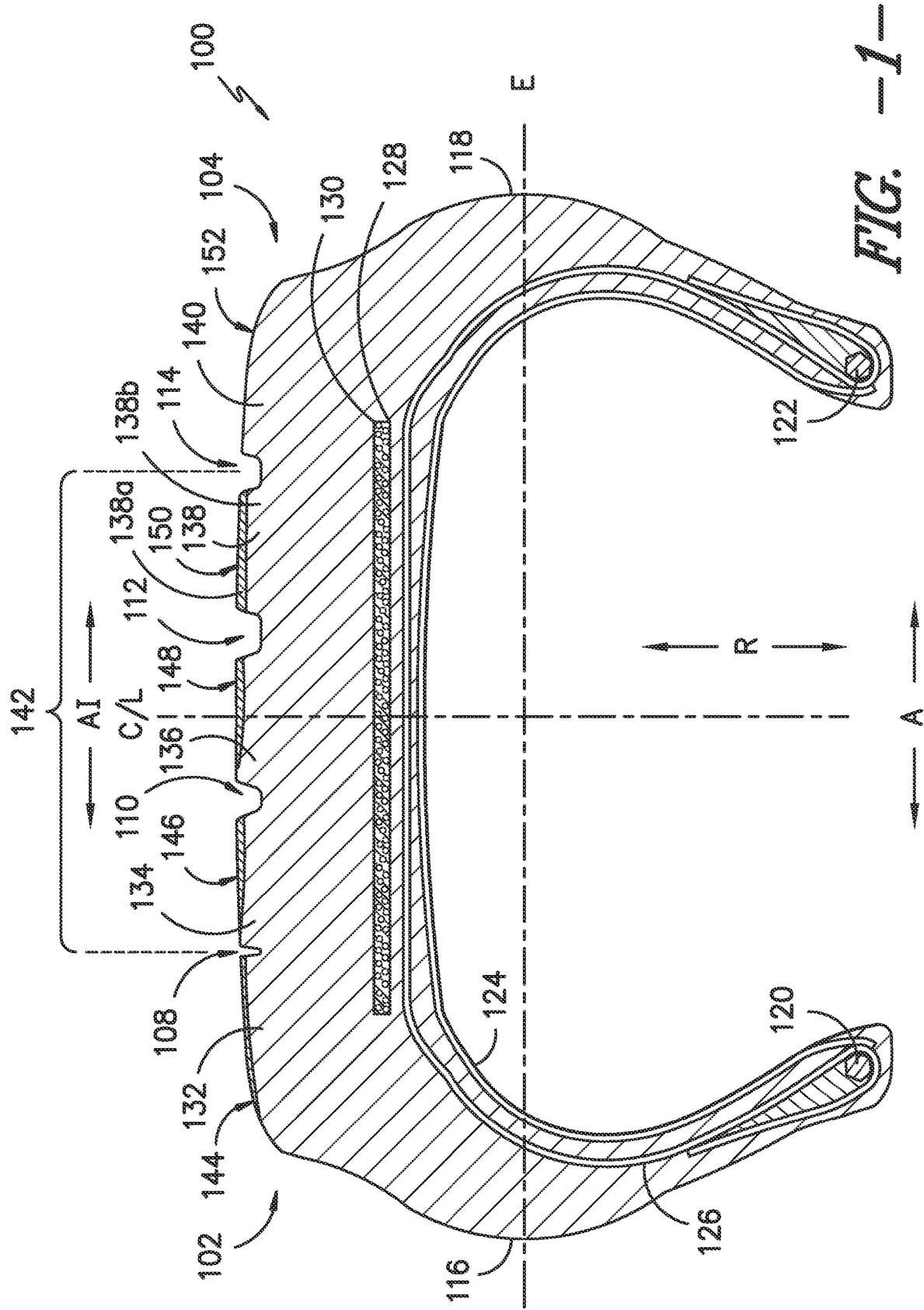
FIG. -1-

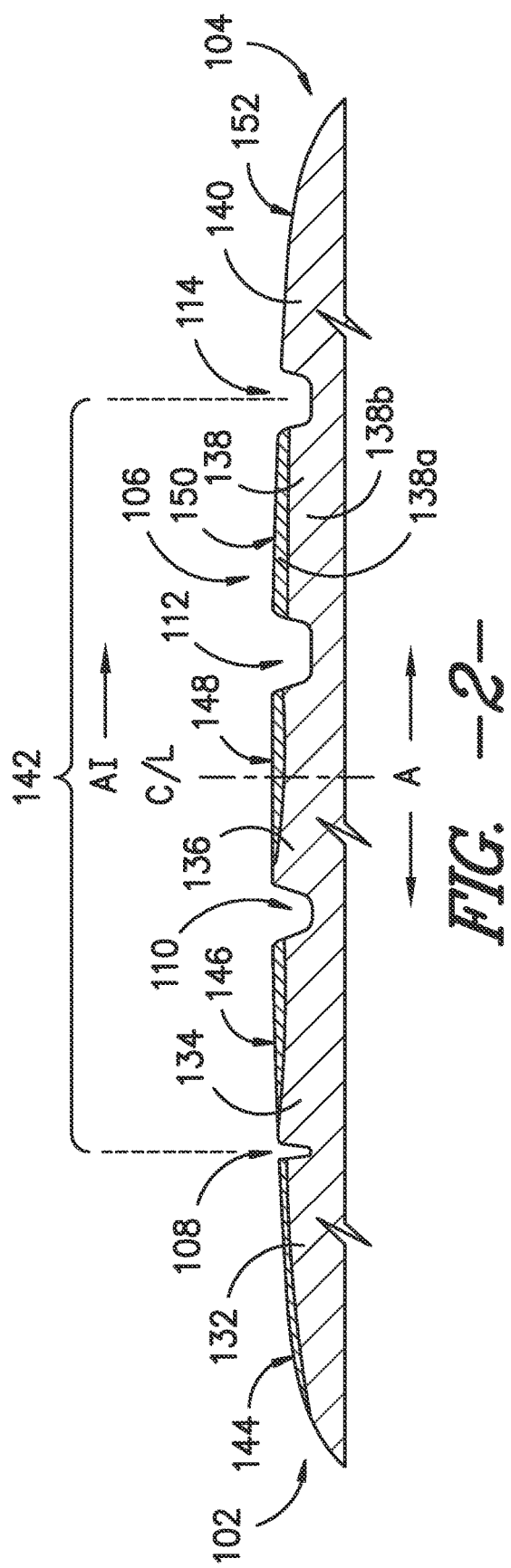
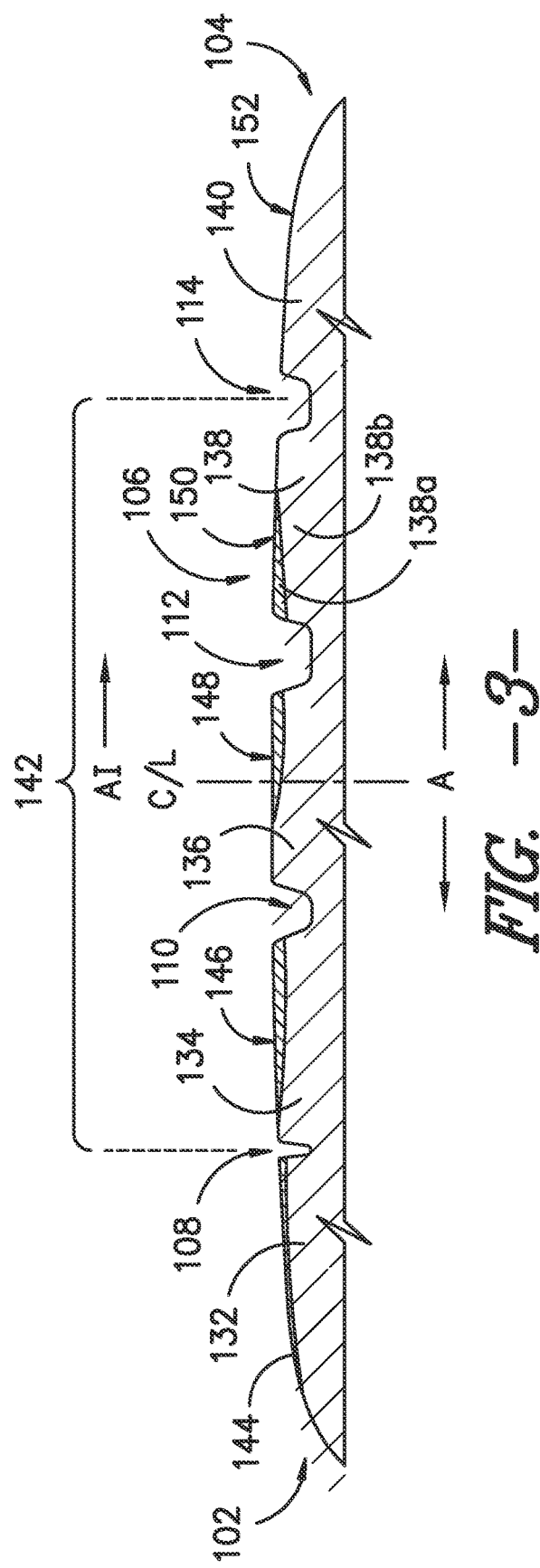

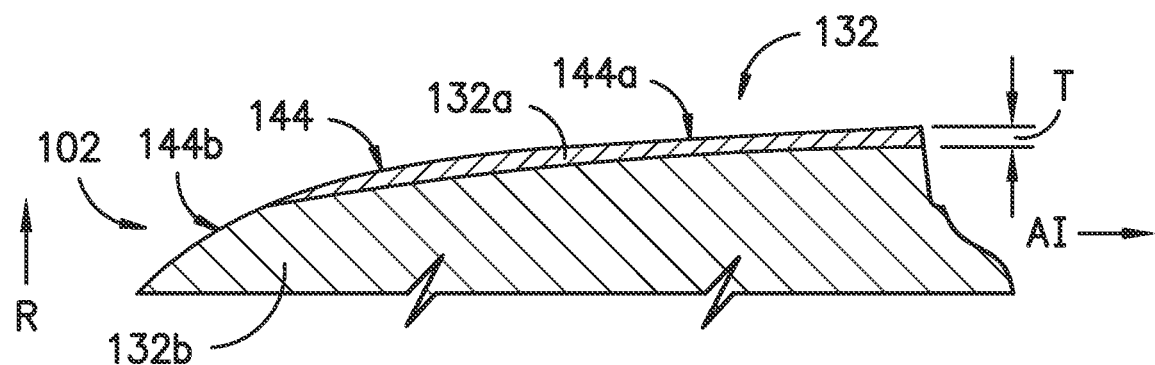
FIG. -4-
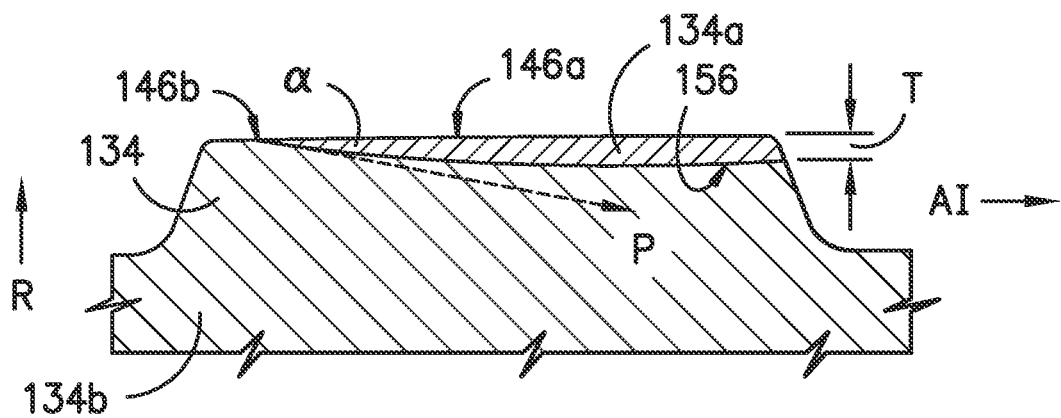
FIG. -5-
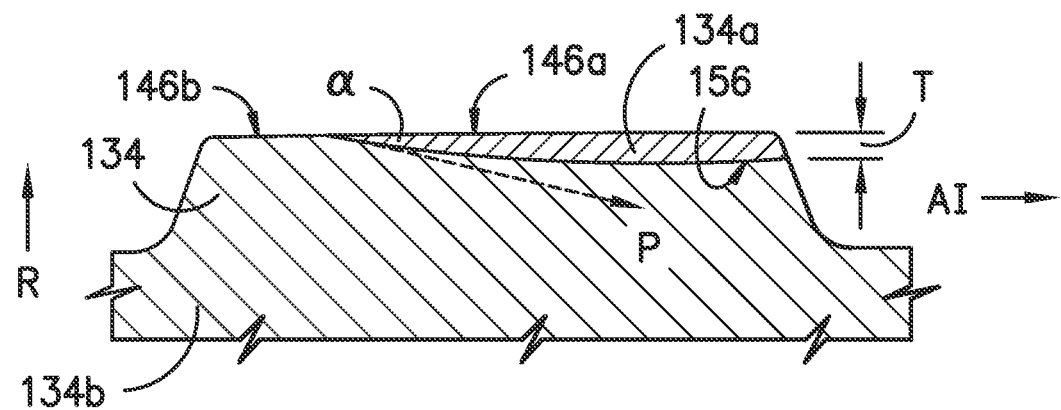
FIG. -6-

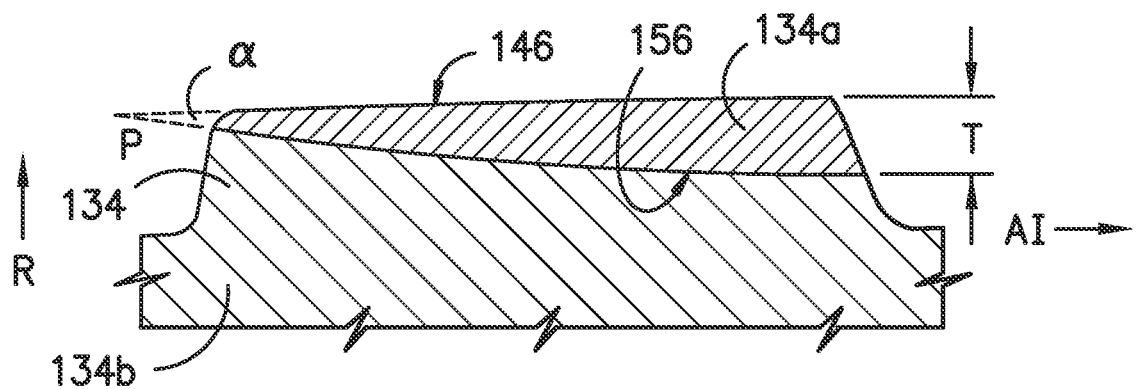
FIG. -7-
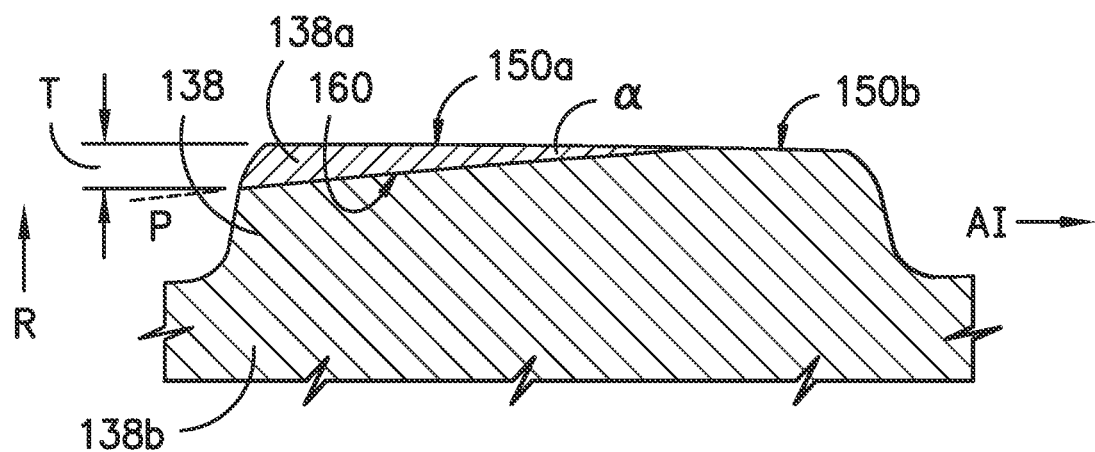
FIG. -8-

HIGH-GRIP PROFILED TREAD SKIMS

FIELD OF THE INVENTION

The subject matter of the present disclosure relates generally to a tire having a layer of higher grip rubber material on one or more tread features.

BACKGROUND OF THE INVENTION

The tread of a tire may be equipped with one more structural features for the purpose of e.g., improving traction and/or rolling resistance performance over a variety of different conditions. For example, grooves, incisions, and other elements may be formed into the tread. The orientation of such features may be specifically determined to provide certain performance characteristics.

Traction performance is not determined solely by such structural features, however. The composition of the materials used to manufacture the tread can also affect traction performance, rolling resistance, or both. Such is particularly true with ultra-high performance (UHP) tires such as racing tires that may be used during relatively high speed and high torque conditions.

For example, relatively softer rubber compositions (i.e. having a lower elastic modulus and/or lower Shore Hardness) have been developed that can provide higher grip under UHP conditions. Unfortunately, such softer rubber compositions also wear quickly. Decreasing the softness of the rubber compositions can improve wear but a trade-off occurs because generally such decrease will also result in less grip. Accordingly, some conventional constructions have proposed rubber compositions that attempt to compromise this trade-off over the useful life of the tread but sacrifices are necessarily made to either grip, wear, or both.

Constructions have also been proposed for non-UHP tires that utilize different rubber compositions within the tread over its useful life. Such have been proposed, for example, to improve wet traction as the tread wears over its useful life and thereby reduces the depth of grooves and channels otherwise available to evacuate water from the contact patch. The tread is designed so that as it wears and the tread depth decreases, the contact surface of the tire is increasingly formed by a relatively softer rubber composition that provides increased wet traction. Unfortunately, for UHP applications, such use of softer, higher grip compositions at a deeper tread depth can lead to blistering and other problems that negatively affect performance as the temperature of the tread increases during use.

Accordingly, a tire that can provide improved grip and wear performance particularly in UHP applications would be useful.

SUMMARY OF THE INVENTION

The present invention provides a tire tread that in an unworn state includes one or more tread features that have a layer of a relatively softer, higher grip rubber material. This layer is formed from a first rubber composition that is provided as a skim or relatively thin layer at the contact surface of the tread feature. This skim provides the grip needed as the tire starts to warm up but can then wear away after an initial period of use so that the contact surface is eventually formed from a second rubber composition. This second rubber composition, in turn, provides the desired level of grip and acceptable wear at the higher temperatures that occur as the tire heats up from use. The layer of skim can be profiled depending upon the application and performance characteristics needed. Additional objects and advantages of the invention will be set forth in part in the following description, or may be apparent from the description, or may be learned through practice of the invention.

In one exemplary embodiment, the present invention provides a tire adapted for mounting onto a rim of a vehicle. The tire has a predetermined orientation for mounting on the vehicle such that the tire defines an outboard shoulder and an inboard shoulder spaced apart along an axial direction of the tire with the inboard shoulder located axially inward of the outboard shoulder relative to the vehicle. The tire includes a tread having a thickness along a radial direction of the tire with the tread defining a plurality of discrete tread features that are separated from each other along the axial direction by grooves. In an unworn state along the axial direction from the outboard side to the inboard side, the tread features include an outboard tread feature positioned along the outboard shoulder of the tire and having an outboard contact surface. The outboard tread feature includes a first layer constructed from a first rubber composition forming at least part of the outboard contact surface and a second layer wholly supporting the first layer of the outboard tread feature and constructed from a second rubber composition. A first interior tread feature is positioned axially inward of the outboard tread feature and has a first interior contact surface. The first interior tread feature includes a first layer constructed from the first rubber composition and forming part of the first interior contact surface, and a second layer wholly supporting the first layer of the first interior tread feature and constructed from a second rubber composition. The second layer of the first interior tread feature also forms part of the first interior contact surface. An inboard tread feature is positioned along the inboard shoulder of the tire and has an inboard contact surface. The first rubber composition has an elastic modulus that is about eighty percent or less of the second rubber composition.

In another exemplary embodiment, the present invention provides a tire adapted for mounting onto a rim of a vehicle. The tire has a predetermined orientation for mounting on the vehicle such that the tire defines an outboard shoulder and an inboard shoulder spaced apart along an axial direction of the tire with the inboard shoulder located axially inward of the outboard shoulder relative to the vehicle. The tire includes a tread having a thickness along a radial direction of the tire with the tread defining a plurality of discrete tread features that are separated from each other along the axial direction by grooves. In an unworn state along the axial direction from the outboard side to the inboard side, the tread features include an outboard tread feature positioned along the outboard shoulder of the tire and having an outboard contact surface. The outboard tread feature includes a first layer having a first rubber composition forming at least part of the outboard contact surface; and a second layer wholly supporting the first layer of the outboard tread feature and including a second rubber composition. A first interior tread feature is positioned axially inward of the outboard tread feature and has a first interior contact surface. The first interior tread feature includes a first layer having a third rubber composition and forming part of the first interior contact surface; and a second layer wholly supporting the first layer of the first interior tread feature and including the second rubber composition. The second layer of the first interior tread feature also forms part of the first interior contact surface. An inboard tread feature is positioned along the inboard shoulder of the tire and has an inboard contact surface. The first rubber composition and the third rubber composition each have an elastic modulus that is about eighty percent or less of the second rubber composition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a cross-sectional view of an exemplary embodiment of a tire and tire tread of the present invention. The view in this figure as well as all of the following figures can also be referred to as a radial cross-section view, which is a cross-section taken in a plane that is parallel to both axial direction A and radial direction R.

FIG. 2 illustrates a radial cross-section view of an exemplary embodiment of a tire tread of the present invention.

FIG. 3 provides another radial cross-section view of an exemplary embodiment of a tire tread of the present invention.

FIGS. 4, 5, 6, 7, and 8 each provide radial cross-section views of exemplary embodiments of tread features of the present invention.

All figures depict an exemplary tread in an unworn condition.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein:

"Modulus of elasticity" or "elastic modulus" of a rubber composition means the secant modulus of extension obtained in fraction according to ASTM standard D 412 of 1998 (specimen "C"): The secant modulus apparent at 10% elongation, denoted "MA10" and expressed in MPa (standard temperature and hygrometric conditions according to ASTM standard D 1349 of 1999) is measured in a second elongation (i.e. after a cycle of accommodation). This modulus of elasticity may be differentiated from the moduli of elasticity obtained in compression and of which the values generally have no connection with the moduli obtained in extension.

"Contact surface" refers to the area of a tire tread or particular tread feature in contact with a planar ground or road surface when the tire is properly mounted (and properly inflated if the tire is pneumatic).

"Unworn" refers to the tire's condition before wear occurs—i.e. before any use occurs that would remove material from the contact surface. All figures in the present application depict the tread or a tread feature in the unworn condition.

The inventors have determined that improved grip and wear performance, particularly in UHP applications, can be achieved by positioning and profiling relatively softer (i.e. lower modulus of elasticity and/or lower Shore Hardness) and relatively harder (i.e. higher modulus of elasticity and/or higher Shore Hardness) rubber compositions in a particular configuration on a tire tread. In general, harder and more wear resistant rubber compositions are provided toward the outboard edge of a tread feature—particularly interior tread features at or along the outboard side of the centerline of the tire—while softer rubber compositions having better grip for traction are provided toward the inboard side to avoid exposure to extreme stress and strains that can cause high wear rate. In addition, depending upon the position of the tread feature—particularly interior tread features—the profile of the softer rubber composition along a radial cross-section can be configured to further enhance effectiveness.

Exemplary embodiments will now be more specifically described for purposes of further explaining the present invention.

FIG. 1 illustrates a radial cross-sectional view of an exemplary embodiment of a tire 100 of the present invention in an unworn condition while FIG. 2 illustrates a tread portion 106 of tire 100. Tire 100 will be used for purposes of description. However, using the teachings disclosed herein, it will be understood that the present invention is not limited to the particular tire construction—including e.g., profile or type—shown in FIG. 1 as other constructions may be used as well.

Tire 100 is adapted for mounting on a rim of a wheel of a vehicle according to a predetermined direction for mounting. More specifically, tire 100 includes an outboard shoulder 102 mounted away from the body of the vehicle and an inboard shoulder 104 that is mounted toward, or along the same side of tire 100 as, the body of the vehicle. Tire 100 defines axial direction A that is parallel to the axis of rotation of the tire during travel and a radial direction R that is orthogonal to axial direction A. As used herein, axially inward refers to the direction illustrated with arrow AI, and is a direction going from the outboard shoulder 102 towards the inboard shoulder 104 along axial direction A as shown.

For this exemplary embodiment, tire 100 includes a pair of bead cores 120 and 122 that are separated along axial direction A. The ends of a carcass ply 126 are wrapped around each bead core 120 and 122. The carcass ply 126 extends between the bead cores and through opposing sidewalls 116, 118 and tread portion 106. Crown plies 128 and 130 can be provided radially inward of tread portion 106 and radially outward of carcass ply 126. Again, other tire constructions may be used with the present invention as well.

Tread 106 has a thickness along radial direction R and defines discrete tread features 132, 134, 136, 138, and 140. These discrete tread features are formed and separated from each other along the axial direction by a plurality of grooves 108, 110, 112, and 114, respectively. While tire 100 is shown to include tread features 132, 134, 136, 138, and 140 illustrated in the form of ribs, the present invention may also be used with a tread having a different number of ribs as well as a tread formed from tread blocks instead of ribs. The tread features include an outboard tread feature 132 positioned along outboard shoulder 102 and an inboard tread feature 140 positioned along inboard shoulder 104.

A plurality 142 of interior tread features are provided between, or interior to, the outboard and inboard tread features 132 and 140, respectively. The interior tread features making up plurality 142 can be referred to relative to their position with respect to outboard tread feature 132 along the axially inward direction AI. Accordingly, plurality 142 includes a first interior tread feature 134 that is axially inward of outboard tread feature 132, a second interior tread feature 136 that is axially inward of first interior tread feature 134, and a third interior tread feature 138 that is axially inward of second interior tread feature 136. First interior tread feature 134 is adjacent to outboard tread feature 132—meaning that another interior tread feature is not positioned between them. Similarly, second interior tread feature 136 is adjacent to first interior tread feature 134, third interior tread feature 138 is adjacent to second interior tread feature 136 and inboard tread feature 140. Interior tread features 134, 136, and 138 provide first interior contact surface 146, second interior contact surface 148, and third interior contact surface 150, respectively, in this exemplary embodiment.

While three interior tread features are shown for this exemplary embodiment of tire 100, it should be understood that the present invention includes tires having one, two, four or more interior tread features as well. Further, although shown as equal in FIGS. 1 through 3, the width along axial direction A of the interior tread features 134, 136, and 138 can be varied between such features.

FIG. 2 provides a closer, radial cross-section view of the exemplary tread 106 of FIG. 1 while FIG. 4 provides a closer, radial cross-section view of outboard tread feature 102. As shown in FIGS. 2 and 4, outboard tread feature 132 has an outboard contact surface 144. Outboard tread feature 132 is constructed from a first layer 132*a* that includes a first rubber composition and a second layer 132*b* that includes a second rubber composition. First layer 132*a* is wholly supported by second layer 132*b*. As used herein, for treads having a depth of about 6.5 mm or greater at the centerline C/L, "wholly supported" means that the first layer forms at least part of the outboard contact surface when tire 100 is in the unworn condition and that the largest thickness T along radial direction R of the first layer is no more than about twenty percent of the of thickness along the radial direction R of the second layer. For treads having a depth of less than about 6.5 mm at the centerline C/L, "wholly supported" means that the first layer forms at least part of the outboard contact surface when tire 100 is in the unworn condition and that the largest thickness T along radial direction R of the first layer is no more than about fifty percent of the of thickness along the radial direction R of the second layer. Accordingly, first layer 132*a* is formed as a skim—i.e. a thin layer 132*a* of the first rubber composition that forms at least a portion 144*a* of the outboard contact surface 144 for outboard tread feature 132.

For this exemplary embodiment, first layer 132*a* forms most or all of the outboard contact surface 144 of outboard tread feature 132. In other exemplary embodiments, the amount of first layer 132*a* forming contact surface 144 may be less. Additionally, for this exemplary embodiment, the thickness T of first layer 132*a* along radial direction R is relatively uniform. However, in other embodiments, thickness T may vary such that first layer 132*a* has a profile along a radial cross-section that tapers along axial direction A.

FIGS. 5, 6, and 7 provide radial cross-section views illustrating exemplary embodiments of a tread feature that may be used for either first interior tread feature 134, second interior tread feature 136, or both. Each will now be described in turn using the reference numerals of the first interior tread feature 134 by way of example—it being understood that the embodiments of FIGS. 5, 6, and 7 can be used for either, or both, of the interior tread features 134 and 136. More specifically, the exemplary embodiments of FIGS. 5, 6, and 7 can be used for interior tread features that are either at or to the outboard side of the centerline C/L of tire 100.

Beginning with FIG. 5, interior tread feature 134 provides an interior contact surface 146 that includes portion 146*a* and 146*b*. Interior tread feature 134 is constructed from a first layer 134*a* that includes a first rubber composition and a second layer 134*b* that includes a second rubber composition. First layer 134*a* is wholly supported by second layer 134*b* and is formed as skim on second layer 134*b*.

As shown in the radial cross-section view of FIG. 5, first layer 134*a* has a profile that increases in thickness T along the axially inward direction AI. First layer 134*a* has a bottom 156 that may be slightly concave (as shown) or linear. In either case, bottom 156 forms an overall angle α with the interior contact surface 146 as depicted with arrow P. Angle α may be, for example, in the range of about 10 degrees to about 30 degrees.

For this exemplary embodiment, first layer 134*a* forms contact surface 146*a*, which is nearly all of the interior contact surface 146. In other embodiments, the amount of first layer 134*a* forming interior contact surface 146 may vary. As stated, the exemplary tread feature of FIG. 5 may be used for either first interior tread feature 134, second interior tread feature 136, or both. As compared to a tire having only one contact surface 146 of either all soft, high-grip material (134*a*) or all hard, more wear resistant, but lower grip material (134*b*), there are a couple advantages. First, if the tread features (146, 148, 150) were comprised of only soft, higher-grip compound, the lack of a more rigid underlying support could lead to severe deformation in the tread features, which results in elevated tread-road surface shear and in a seriously high wear rate of two-to-three times faster than the embodiment with the high-grip tread skim combined with the more enduring and supportive underlying tread rubber. In the reverse situation, of having only the harder, more wear resistant rubber comprising all of the contact surface (134*b* only over 100% of contact surface 146) there is the potential of increased sliding due to the low grip levels, which can result in significant increase of temperatures and further mechanical degradation (softening) of the tread features that can ultimately result in inferior handling and slower lap times. The inventors have determined that this exemplary embodiment can provide a more improved tread feature configuration that is especially less sensitive to non-ideal camber curves that allows tire 100 to roll into a positive camber in a turn where tire 100 experiences relatively high cornering forces. The tread features of this exemplary embodiment are more optimized to provide and maintain the best level of grip while minimizing wear that occurs with severe cornering, Referring now to FIG. 6, this interior tread feature 134 provides another exemplary embodiment of a tread feature 134 that may be used for either first interior tread feature 134, second interior tread feature 136, or both. This exemplary embodiment is similar to FIG. 5 except, as shown, the amount 146*a* of the interior contact surface 146 formed by first layer 134*a* is less for this embodiment than for the embodiment shown in FIG. 5. As compared to a tire having the wider interior contact surface like 146*a* of FIG. 5, this tire would be more advantageous for a vehicle with even poorer camber control. In other words, this embodiment can provide more wear resistant rubber along the tread feature's outer edge for protection on the exterior tires in hard cornering. Hard cornering places the outside edges of tread features (especially outside the tire center line) under much more severe situations for cornering stresses and wear. The inventors have determined that this embodiment can provide improved tread features that are less sensitive to non-ideal camber control in a turn where tire 100 experiences relatively high cornering forces. The tread features are more optimized to provide and maintain the best level of grip while minimizing wear that occurs with severe cornering in this situation by increasing the portion of 134*b* (harder wear resistant compound) relative to the 134*a* portion (shorter softer, high-grip compound) on 146, the interior contact surface.

A third exemplary embodiment of an interior tread feature that can be used for either or both of tread features 134 and 136 is shown in FIG. 7. Here, interior tread feature 134 is constructed from a first layer 134*a* that includes a first rubber composition and a second layer 134*b* that includes a second rubber composition. First layer 134*a* is wholly supported by second layer 134*b* and is formed as a skim on second layer 134*b*. This exemplary embodiment is similar to the previous embodiment of FIGS. 5 and 6, except that for the embodiment of FIG. 7—first layer 134 forms all of the interior contact surface 146 for the unworn condition shown. As compared to a tire with both 134*a* and 134*b* forming the interior contact surface 146, a tire with embodiment of FIG. 7 can provide a larger area of high-grip tread material in the favorable situations. Examples applications include: 1) vehicles with excellent levels of camber control keeping the tread features parallel or nearly parallel with road surface for the majority of maneuvers (uniform or nearly uniform distribution of stresses across the tread band); 2) or, if the tread feature is interior of the tire's centerline away from the most severe cornering stresses and wear (exterior); 3) or if the feature is of low tread depth and is not as exposed to the high-shear and significant tread wear due to the improved stiffness of low tread depth features (UHP/DOT legal race tires with hallow tread depth often fall into this group. The embodiment of FIG. 7 is useful in all these situations where wear is less of an issue and the softer, higher-grip tread rubber can remain intact with a lower wear rate to provide significant grip for longer durations. Likewise, the embodiment of FIG. 7 is also preferred over the embodiment of a tread feature composed of only the softer high-grip rubber because without the support of the larger volume and higher modulus of 134*b*, the softer 134*a* layer still tends to wear at a significantly increase rate (two-to-three times the embodiment of FIG. 7) due to the overall deformation of the tread feature and the resulting shear at the road-and-tread feature interface.

Referring back to FIG. 2, as previously indicated, tread 102 includes a third interior tread feature 106 having a third interior contact surface 150. For the exemplary embodiment shown in FIG. 2, third interior tread feature 106 includes a first layer 138*a* formed from a first rubber composition and having a relatively uniform thickness T along axial direction A. In addition, first layer 138*a* forms all of third interior contact surface 150 when tire 100 is in an unworn condition. As with previous embodiments, first layer 138*a* is wholly supported by first layer 138*b*, which is constructed from a second rubber composition.

FIG. 8 provides another exemplary embodiment of third interior tread feature 138. This exemplary embodiment is similar to the exemplary embodiment depicted in FIG. 2 except that in FIG. 8 first layer 138*a* forms only a portion 150*a* of the third interior contact surface 150. For this exemplary embodiment, second layer 138*b* also forms a portion 150*b* of third interior contact surface 150. Additionally, as shown in the radial cross-section view of FIG. 8, the profile of first layer 138*a* has a bottom 160 that forms an angle α with respect to third interior contact surface 150. Similar to previous tread feature embodiments, angle α may be, for example, in the range of about 10 degrees to about 30 degrees. However, unlike previous embodiments, first layer 138*a* has a thickness T that decreases along the axially inward direction AI—i.e. in a direction moving from the outboard side 102 towards the inboard side 104 of tire 100. Although bottom 160 is shown as linear, its profile could also be accurate as well. As compared to the embodiment for tread feature 138 shown in FIG. 1, the inventor have determined that the tread feature 138 shown in FIG. 8 can provide improved cornering grip and wear resistance for the situation where the inside of the tire is subjected to the most severe stresses and loading. This situation typically occurs only on the interior tire on the inside cornering position on a vehicle with less than ideal camber control. It should be noted that the embodiments for the third interior tread feature shown in FIGS. 1, 2, 3, and 8 are appropriate for an interior tread feature that is positioned inboard of the centerline C/L of tire 100.

As stated above, for each exemplary tread feature, the first layer is constructed from a first rubber composition while the second layer is construction from a second rubber composition. In one exemplary aspect of the present invention, the first rubber composition has an MA10 at 23° C. of about 3.5 to about 5 while the second rubber composition has an MA10 at 23° C. of about 6 MPa or greater. In still another exemplary aspect of the present invention, the first rubber composition has a Shore A hardness of about 50 to about 65 while the second rubber composition has Shore A hardness of about 70 or greater. As used herein, Shore A hardness is measured according to ASTM D2240 (1997).

It should be understood that the same first rubber composition may be used in each of the first layers of tread features 132, 134, 136, 138, and/or 140 as described above. Alternatively, the composition of the first layer of each such tread feature may vary from tread feature to tread feature provided that a rubber composition having an elastic modulus and/or Shore Hardness relative to the second layer as described above is employed. For example, a first rubber composition may be used for the first layer of one tread feature while a third rubber composition is used for the first layer of another tread feature—and the first layer of each such tread feature may be supported by a second layer constructed from a second rubber composition.

As stated previously, the thickness of the first layer may vary. In one exemplary embodiment, the thickness T along radial direction R of the first layer is about 2.5 mm or less. Where the thickness varies with angle a as set forth above, a maximum thickness T along radial direction R of about 2.5 mm or less may be used in certain exemplary embodiments. In still other embodiments, the maximum thickness T of the first layer is in the range of about 0.5 mm to about 2.5 mm. In still other embodiments, where the tread has a thickness at centerline C/L that is below about 6.5 mm, the maximum thickness T could be in the range of about 2.5 mm to about 4 mm.

Returning to FIG. 2, inboard tread feature 140 is shown without a first layer of tread rubber in this exemplary embodiment. However, in other exemplary embodiments of the invention, inboard tread feature could be constructed with a profiled first layer of tread rubber in a manner similar to that used e.g., for the third interior tread feature 138. As such, inboard tread feature 140 could be constructed with a first layer forming all or part of the contact surface and having a constant thickness along the radial direction or having a thickness that tapers along the axially inward direction AI. Other configurations may be used as well.

FIG. 3 provides another exemplary embodiment of a tread portion 106 of the present invention. This embodiment is similar to the exemplary embodiment of FIG. 1 with certain exceptions. For instance, second interior tread feature 136 has a smaller portion of the first layer forming third interior contact surface 148 in a manner similar to the construction shown in FIG. 6. In addition, third interior tread feature 138 has a profiled first layer than tapers along the axially inward direction so that only a portion of the contact surface is formed by the first layer in a manner similar to the construction shown in FIG. 8. As compared to the exemplary embodiment of FIG. 2, the exemplary tread portion 106 of FIG. 3 has shown improved grip and resistance to wear for the tire on the inside of a cornering vehicle where the inboard shoulder (104) becomes exposed to the highest cornering stresses and wear. In this situation (inside wheel in a corner), the inboard shoulder (104) and inner half of the tread (152, 150, 148) are carrying the highest, or all the normal and cornering force loads. The exterior side (102) of the tire may not even be in contact with the road surface due to weight transfer and insufficient camber control to keep the whole tread band or even part of the interior portion of the inner cornering tire in contact with the road surface. In this situation, the tread skim of the tread portion 106 in the orientation of FIG. 8 (or, FIG. 3 for all tread portions) provides the best grip and resistance to track wear for the tire on the interior position of the cornering vehicle.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A tire adapted for mounting onto a rim of a vehicle, the tire having a predetermined orientation for mounting on the vehicle such that the tire defines an outboard shoulder and an inboard shoulder that are spaced apart along an axial direction of the tire with the inboard shoulder located axially inward of the outboard shoulder relative to the vehicle, the tire including a tread having a thickness along a radial direction of the tire, the tread defining a plurality of discrete tread features that are separated from each other along the axial direction by grooves, wherein in an unworn state along the axial direction from the outboard side to the inboard side, the tread features comprise:
   an outboard tread feature positioned along the outboard shoulder of the tire and having an outboard contact surface, the outboard tread feature comprising
      a first layer comprising a first rubber composition forming at least part of the outboard contact surface;
      a second layer wholly supporting the first layer of the outboard tread feature and comprising a second rubber composition;
   a first interior tread feature positioned axially inward of, and adjacent to, the outboard tread feature and having a first interior contact surface, wherein the first interior tread feature comprises
      a first layer comprising the first rubber composition and forming part of the first interior contact surface, wherein along a radial cross-section the first layer of the first interior tread feature has a profile that increases in thickness along the axial direction from the outboard shoulder towards the inboard shoulder;
      a second layer wholly supporting the first layer of the first interior tread feature and comprising the second rubber composition, the second layer of the first interior tread feature also forming part of the first interior contact surface;
   a second interior tread feature positioned axially inward, and adjacent to, of the first interior tread feature and having a second interior contact surface, wherein the second interior tread feature comprises
      a first layer comprising the first rubber composition and forming part of the second interior contact surface; and
      a second layer wholly supporting the first layer of the second interior tread feature and comprising the second rubber composition, the second layer of the second interior tread feature also forming part of the second interior contact surface; and
   an inboard tread feature positioned along the inboard shoulder of the tire and having an inboard contact surface;
   wherein the first rubber composition has an elastic modulus that is eighty percent or less of the second rubber composition.

2. The tire of claim 1, wherein along the radial cross-section the profile of the first layer of the first interior tread feature has a bottom that forms an overall angle in the range of 10 degrees to 30 degrees with the first interior contact surface.

3. The tire of claim 2, wherein along the radial cross-section the profile of the first layer of the first interior tread feature has a maximum thickness in the range of 2.5 mm or less.

4. The tire of claim 1, wherein along a radial cross-section the first layer of the second interior tread feature has a profile that is substantially the same as the profile of the first layer of the first interior tread feature along the radial cross-section.

5. The tire of claim 1, wherein along a radial cross-section the first layer of the second interior tread feature has a profile that increases in thickness along the axial direction from the outboard shoulder towards the inboard shoulder.

6. The tire of claim 1, further comprising:
   a third interior tread feature positioned axially inward of, and adjacent to, the second interior tread feature and having a third interior contact surface, wherein the third interior tread feature comprises
      a first layer comprising the first rubber composition and forming at least part of the third interior contact surface; and
      a second layer wholly supporting the first layer of the third interior tread feature and comprising the second rubber composition.

7. The tire of claim 6, wherein along a radial cross-section the first layer of the third interior tread feature has a profile that is substantially uniform in thickness along the axial direction.

8. The tire of claim 6, wherein the second layer of the third interior tread feature also forms part of the third interior contact surface.

9. The tire of claim 6, wherein along a radial cross-section the first layer of the third interior tread feature has a profile having a thickness that decreases along the axially inward direction.

10. The tire of claim 1, wherein first rubber composition has an MA10 at 23° C. of 4.5 MPa or less.

11. The tire of claim 10, wherein second rubber composition has an MA10 at 23° C. of 6 MPa or more.

12. The tire of claim 1, wherein the first interior tread feature contact surface comprises 60 percent or more of the first rubber composition.

13. A tire adapted for mounting onto a rim of a vehicle, the tire having a predetermined orientation for mounting on the vehicle such that the tire defines an outboard shoulder and an inboard shoulder that are spaced apart along an axial direction of the tire with the inboard shoulder located axially inward of the outboard shoulder relative to the vehicle, the tire including a tread having a thickness along a radial direction of the tire, the tread defining a plurality of discrete tread features that are separated from each other along the axial direction by grooves, wherein in an unworn state along the axial direction from the outboard side to the inboard side, the tread features comprise:
   an outboard tread feature positioned along the outboard shoulder of the tire and having an outboard contact surface, the outboard tread feature comprising
      a first layer comprising a first rubber composition forming at least part of the outboard contact surface;
      a second layer wholly supporting the first layer of the outboard tread feature and comprising a second rubber composition;
   a first interior tread feature positioned axially inward of, and adjacent to, the outboard tread feature and having a first interior contact surface, wherein the first interior tread feature comprises
      a first layer comprising the first rubber composition and forming part of the first interior contact surface;
      a second layer wholly supporting the first layer of the first interior tread feature and comprising the second rubber composition, the second layer of the first interior tread feature also forming part of the first interior contact surface; and
   an inboard tread feature positioned along the inboard shoulder of the tire and having an inboard contact surface, wherein the inboard tread feature comprises
      a first layer comprising the first rubber composition and forming part of the inboard contact surface; and
      a second layer wholly supporting the first layer of the inboard tread feature and comprising the second rubber composition, wherein the second layer of the inboard tread feature also forms part of the inboard tread contact surface;
   wherein the first rubber composition has an elastic modulus that is eighty percent or less of the second rubber composition.

14. A tire adapted for mounting onto a rim of a vehicle, the tire having a predetermined orientation for mounting on the vehicle such that the tire defines an outboard shoulder and an inboard shoulder spaced apart along an axial direction of the tire with the inboard shoulder located axially inward of the outboard shoulder relative to the vehicle, the tire including a tread having a thickness along a radial direction of the tire, the tread defining a plurality of discrete tread features that are separated from each other along the axial direction by grooves, wherein in an unworn state along the axial direction from the outboard side to the inboard side, the tread features comprise:
   an outboard tread feature positioned along the outboard shoulder of the tire and having an outboard contact surface, the outboard tread feature comprising
      a first layer comprising a first rubber composition forming at least part of the outboard contact surface;
      a second layer wholly supporting the: first layer of the outboard tread feature and comprising a second rubber composition;
   a first interior tread feature positioned axially inward of, and adjacent to, the outboard tread feature and having a first interior contact surface, wherein the first interior tread feature comprises
      a first layer comprising a third rubber composition different from the first rubber composition and the second rubber composition and forming part of the first interior contact surface;
      a second layer wholly supporting the first layer of the first interior tread feature and comprising the second rubber composition, the second layer of the first interior tread feature also forming part of the first interior contact surface; and
   an inboard tread feature positioned along the inboard shoulder of the tire and having an inboard contact surface;
   wherein the first rubber composition and the third rubber composition each have an elastic modulus that is eighty percent or less of the second rubber composition.

* * * * *